(12) United States Patent
Staeck

(10) Patent No.: US 11,695,134 B2
(45) Date of Patent: Jul. 4, 2023

(54) METHOD FOR HUMIDIFYING A REACTANT, AND FUEL CELL SYSTEM FOR CARRYING OUT THE METHOD

(71) Applicants: AUDI AG, Ingolstadt (DE); Volkswagen AG, Wolfsburg (DE)

(72) Inventor: Rune Staeck, Gifhorn (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 197 days.

(21) Appl. No.: 16/972,519

(22) PCT Filed: Apr. 9, 2019

(86) PCT No.: PCT/EP2019/058857
§ 371 (c)(1),
(2) Date: Dec. 4, 2020

(87) PCT Pub. No.: WO2019/233655
PCT Pub. Date: Dec. 12, 2019

(65) Prior Publication Data
US 2021/0273246 A1  Sep. 2, 2021

(30) Foreign Application Priority Data

Jun. 7, 2018  (DE) .................. 10 2018 208 989.2

(51) Int. Cl.
*H01M 8/04119*  (2016.01)
*H01M 8/04746*  (2016.01)
(Continued)

(52) U.S. Cl.
CPC ... *H01M 8/04149* (2013.01); *H01M 8/04141* (2013.01); *H01M 8/04753* (2013.01);
(Continued)

(58) Field of Classification Search
CPC ......... H01M 8/04126; H01M 8/04141; H01M 8/04149; H01M 8/04156; H01M 8/04164;
(Continued)

(56) References Cited

U.S. PATENT DOCUMENTS

2003/0190511 A1  10/2003  Yoshizawa
2004/0112740 A1*  6/2004  Shen ................... H01M 8/0263
                                                      204/263

(Continued)

FOREIGN PATENT DOCUMENTS

| CN | 106784929 A | 5/2017 |
|---|---|---|
| DE | 199 21 007 C1 | 11/2000 |
| DE | 10 2004 023 116 A1 | 12/2005 |
| DE | 10 2011 111 742 A1 | 2/2013 |
| DE | 10 2011 122 306 A1 | 6/2013 |
| DE | 10 2013 014 952 A1 | 3/2015 |
| DE | 10 2015 122 144 A1 | 6/2017 |

(Continued)

*Primary Examiner* — Matthew W Van Oudenaren
(74) *Attorney, Agent, or Firm* — Seed IP Law Group LLP

(57) ABSTRACT

A method for humidifying a reactant in a fuel cell system is provided having a fuel cell stack, which is fluidically connected to a humidifier, wherein the humidifier comprises a membrane, on whose surface channels are formed. At least one of the channels is associated with a storage element for temporary storing of liquid water, the method involving the following steps: extracting the liquid water from the fuel cell stack and feeding the liquid water to the humidifier, admitting at least part of the liquid water into the storage element and temporarily storing the part therein, at least partially emptying the storage element by evaporating of the liquid water and humidifying of the reactant being supplied to the fuel cell stack by means of the evaporated liquid water, wherein the liquid water is extracted from the fuel cell stack both at the anode side and at the cathode side. A fuel cell system for carrying out the method is also provided.

9 Claims, 3 Drawing Sheets

(51) Int. Cl.
*H01M 8/04492* (2016.01)
*H01M 8/04828* (2016.01)

(52) U.S. Cl.
CPC .... *H01M 8/04156* (2013.01); *H01M 8/04164* (2013.01); *H01M 8/04507* (2013.01); *H01M 8/04514* (2013.01); *H01M 8/04522* (2013.01); *H01M 8/04835* (2013.01); *H01M 8/04843* (2013.01); *H01M 2250/20* (2013.01)

(58) Field of Classification Search
CPC ......... H01M 8/04171; H01M 8/04179; H01M 8/04492; H01M 8/04507; H01M 8/04514; H01M 8/04522; H01M 8/04828; H01M 8/04835; H01M 8/04843
See application file for complete search history.

(56) References Cited

U.S. PATENT DOCUMENTS

| | | | |
|---|---|---|---|
| 2006/0147774 A1 | 7/2006 | Suzuki et al. | |
| 2008/0090124 A1* | 4/2008 | Barleben | H01M 8/04291 429/514 |
| 2010/0323251 A1* | 12/2010 | Brandt | H01M 8/04149 429/413 |
| 2015/0125767 A1* | 5/2015 | Wake | H01M 8/0491 429/414 |

FOREIGN PATENT DOCUMENTS

| | | |
|---|---|---|
| JP | 2006-521004 A | 9/2006 |
| JP | 2006-269160 A | 10/2006 |
| WO | 2017/102538 A1 | 6/2017 |

\* cited by examiner

METHOD FOR HUMIDIFYING A REACTANT, AND FUEL CELL SYSTEM FOR CARRYING OUT THE METHOD

TECHNICAL FIELD

Embodiments of the invention relate to a method for humidifying a reactant in a fuel cell system having a fuel cell stack, which is fluidically connected to a humidifier, wherein the humidifier comprises a membrane, on whose surface channels are formed, wherein at least one of the channels is associated with a storage element for temporary storing of liquid water, involving the following steps:
- extracting the liquid water from the fuel cell stack and feeding the liquid water to the humidifier,
- admitting at least part of the liquid water into the storage element and temporarily storing the part therein,
- at least partially emptying the storage element by evaporating of the liquid water and humidifying of the reactant being supplied to the fuel cell stack by means of the evaporated liquid water.

Embodiments of the invention furthermore relate to a fuel cell system for carrying out the method, having a fuel cell stack, which is connected to an anode feed line for feeding an anode gas on the anode side and to an anode exhaust line for discharging the anode gas, and connected to a cathode feed line for feeding a cathode gas on the cathode side and a cathode exhaust line. The cathode exhaust line is fluidically connected to a humidifier and the humidifier has a water vapor permeable membrane, on whose surface channels are formed, wherein at least one of the channels is associated with a storage element for the temporary storing of liquid water.

BACKGROUND

DE 10 2015 122 144 A1 describes a fuel cell system having a humidifier. The humidifier is supplied with liquid water on the cathode side from the cathode drain line. Furthermore, the humidifier comprises a flow field with storage elements to take up liquid water, which is delivered across a membrane to the dry cathode gas, humidifying it.

Moreover, liquid water generally accrues in fuel cell systems, which when admitted to the fuel cell stack may result in disturbed operation and damaging of the stack. Usually, therefore, the liquid water is collected in separators and continuously drained away by the switching of valves into the gas flow or onto the roadway, thus being for the most part unused.

BRIEF SUMMARY

A method for humidifying a reactant, and a fuel cell system for carrying out the method, by way of which it becomes possible to reduce the size of the humidifier while at the same time adequately humidifying the reactant, are provided.

In particular, the liquid water is removed from the fuel cell stack on both the anode side and the cathode side. Because of the temporary storing and subsequent extracting of liquid water in the flow field, less transfer of liquid water through the humidifier membrane is required, so that the membrane surface and consequently the size of the humidifier can be reduced. Because the liquid water is fed to the humidifier not only on the cathode side, but also on the anode side, a larger volume of liquid water can be stored in the humidifier and removed as needed. The water accruing any way in the anode spaces and cathode spaces does not need to drain out unused, but instead can be reused.

In one advantageous embodiment, it is provided that the emptying of the liquid water from the storage element occurs when the humidity of the membrane drops below a predetermined or predeterminable threshold value. This threshold value could be determined by means of an electrical conductivity of the humidifier. Alternatively, the liquid water can also be automatically drained from the storage elements in regular timed cycles. In another alternative embodiment, the storage elements are emptied when no liquid water is being supplied or can be supplied from the fuel cell stack, or the fuel cell system is operating in an operating mode in which there is a greater need for water.

In particular, a liquid water feed line is provided, connected to the anode exhaust line, being connected directly or indirectly to the humidifier for feeding liquid water to the humidifier on the anode side. This allows the water also accruing on the anode side not to be removed unused from the fuel cell system, but instead to be supplied to the humidifier and be temporarily stored in the at least one storage element. Because of this effective temporary storing of the liquid water in the at least one storage element, a humidification of the reactant can occur during the extraction of the liquid water, so that less water transfer is required through the membrane of the humidifier, and therefore the membrane surface and consequently the size of the humidifier can be reduced. In one embodiment, the anode exhaust line can be connected directly by the humidity feed line to the humidifier, the humidifier having an additional port for the humidity feed line. In an alternative embodiment, the anode exhaust line is indirectly connected to the humidifier, the humidity feed line being connected to the cathode exhaust line and/or to the cathode feed line. The humidity feed line may be connected to the cathode feed line downstream from a compressor. This enables a feeding of the liquid water from two sides of the humidifier and results in a more uniform filling and storing of the liquid water in a flow field. An actuator formed as a valve in the liquid water line at the connection to the anode exhaust line and/or at the connection to the cathode exhaust line and/or at the connection to the cathode feed line, in order to control the feeding of the liquid water to the humidifier, may be provided. A plurality of storage elements associated with the channels may be provided, so that a larger flow field with accumulated liquid water and thus a uniform humidifying of the reactant with a reduced size of the humidifier becomes possible. The storage elements can be arranged in a (regular) distribution over the entire surface, or alternatively they can be arranged in individual regions of the surface, especially those which are especially dry.

In particular, the channels may be formed by a plurality of flow webs arranged on the surface, and at least one of the flow webs has a connection channel running perpendicular to a longitudinal extension of the flow webs for pressure equalization between the channels. This enables a more uniform distribution of the liquid water being stored and results in improved stability of the humidifier. In particular, it is provided that the at least one storage element is formed in the channel and/or is arranged on the flow web. The number of connection channels may be adapted to the number of storage elements.

Furthermore, the diameter of the connection channel may be chosen such that the surface tension of the liquid water in the storage element prevents the liquid water from passing through the connection channel. This makes it possible for the liquid water to stay in the storage element.

The flow webs may be arranged relative to each other such that broad channels are formed or provided with a first diameter, and narrow channels with a smaller diameter than the first diameter. In particular, at least one of the narrow channels is situated adjacent to one of the broad channels. This makes it possible for the liquid water to move in the narrow channels with a higher velocity than in the broad channels, i.e., the static pressure in the narrow channels is lower than in the broad channels. A pressure equalization is achieved by the connection channels and the liquid water is drawn into the storage devices.

In an alternative embodiment, it is provided that the storage element is formed as a pocket formed or arranged on the flow web, in which the liquid water can be received. The pocket may be formed in the broad channels, open against the flow direction.

An especially easily manufactured configuration of the membrane provides that at least two elevations are formed in one of the channels, such that the storage element is formed as a pocket between the two elevations. The elevations may be formed as knobs, for example.

In another alternative embodiment, it is provided that at least two elevations are formed in one of the broad channels, such that the storage element is formed as a pocket formed between the two elevations. In particular, a plurality of elevations may be arranged in the broad channels.

DESCRIPTION OF THE SEVERAL VIEWS OF THE DRAWINGS

Further advantages, features, and details result from the claims, the following description of embodiments, and the drawings.

DETAILED DESCRIPTION

Figure 1:
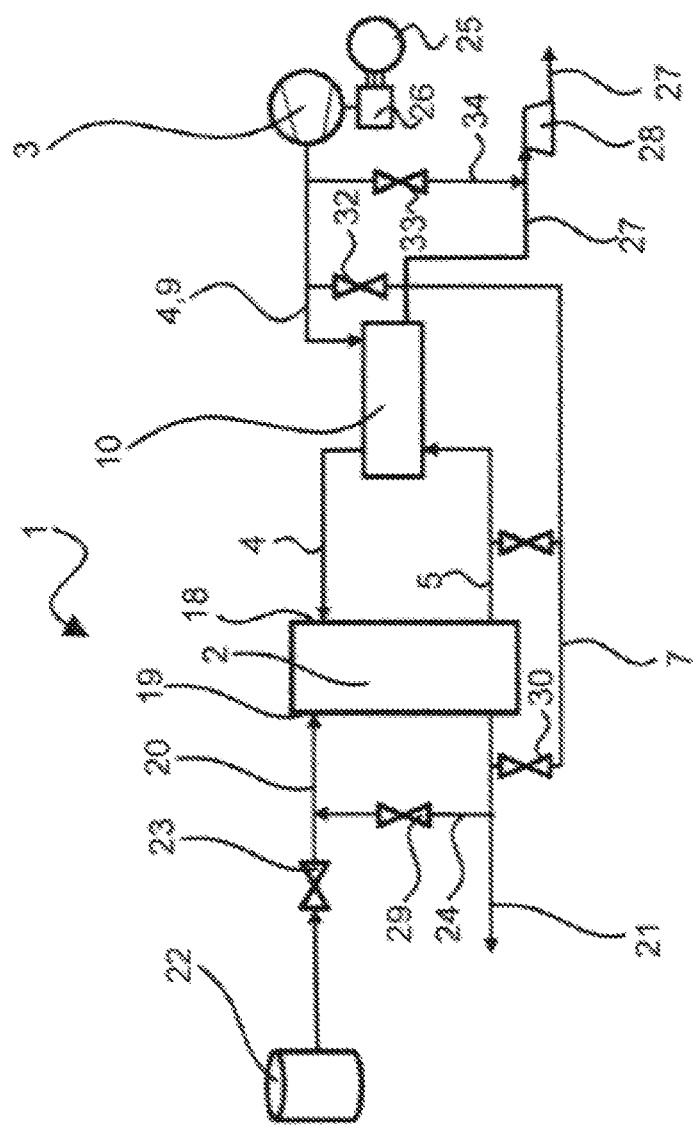
FIG. 1 shows a schematic representation of a fuel cell system.

FIG. 1 shows a fuel cell system 1. The fuel cell system 1 is part of a vehicle not otherwise represented, especially a fuel cell vehicle, having an electric traction motor which is supplied with electric energy by means of the fuel cell system 1.

The fuel cell system 1 comprises, as its key component, a fuel cell stack 2, having a plurality of not otherwise represented fuel cells, arranged in a stack. Each fuel cell is associated with an anode space 18 and a cathode space 19, the anode and the cathode being separated from each other by an ionically conductive polymer electrolyte membrane. Moreover, between every two such membrane/electrode arrangements there is situated a not otherwise represented bipolar plate, which serves for feeding the reactants to the anode and cathode spaces 18, 19 and moreover produces the electrical connection between the individual fuel cells.

In order to supply the fuel cell stack 2 with the reactants, the fuel cell stack 2 is connected at the anode side to an anode feed line 20 for feeding a hydrogen-containing anode gas from an anode gas reservoir 22 and to an anode exhaust line 21 for removing the unreacted anode gas.

The anode operating pressure on the anode side of the fuel cell stack 2 is adjustable by a first actuator 23 in the anode feed line 20. Furthermore, the fuel cell system 1 may have a fuel recirculation line 24 on the anode side, as shown, which connects the anode exhaust line 21 to the anode feed line 20. The recirculation of fuel is customary for returning and utilizing the usually hyperstoichiometric fuel from the fuel cell stack 2. A not otherwise represented recirculation blower can be arranged in the fuel recirculation line 24, with which the recirculation rate can be adjusted. A second actuator 29 may also be present.

On the cathode side, the fuel cell stack 2 is connected to a cathode feed line 4 for feeding the oxygen-containing cathode gas. A compressor 3 is arranged in a portion of the cathode feed line 4 configured as a dry feed line 9 for the delivery and compression of the cathode gas. In the embodiment shown, the compressor 3 is designed as a primarily electric motor-driven compressor 3, whose drive comes from an electric motor 26 outfitted with an appropriate power electronics 25.

The compressor 3 is used to feed the cathode gas, drawn in from the surroundings, to a humidifier 10 by means of the dry feed line 9. A second part of the cathode feed line 4 connects the humidifier 10 to the fuel cell stack 2 and leads humidified cathode gas to the cathode spaces 18 of the fuel cell stack 2. Furthermore, liquid water and unreacted cathode gas are led back to the humidifier 10 by a cathode exhaust line 5, or the unreacted cathode exhaust gas (especially exhaust air) is optionally guided from the cathode spaces 18 of the fuel cell stack 2 to an exhaust system, not shown. Finally, the humidifier 10 also has a humidifier drain line 27, in which a turbine 28 is situated, which is driven by means of the humidifier exhaust gas flowing through the humidifier drain line 27 and thereby supporting in turn the driving of the compressor 3 by means of a common shaft, not shown. The humidifier drain line 27 furthermore has a water separator, not shown, upstream from the turbine 28, protecting the turbine 28 from damage due to water vapor entrained in the cathode exhaust gas even after flowing through the humidifier 10.

Furthermore, there is provided a liquid water feed line 7, which connects the anode exhaust line 21 indirectly to the humidifier 10, the anode exhaust line 21 being connected to the cathode exhaust line 5 by means of the liquid water feed line 7. Furthermore, the liquid water feed line 7 is connected to the cathode feed line 4 downstream from the compressor 3, i.e., to the dry feed line 9. This enables a feeding of both liquid water accruing on the cathode side (product water) and liquid water accruing in the fuel cell stack 2 on the anode side to the humidifier 10. In the liquid water feed line 7 are thereby arranged a third actuator 30 for controlling the feeding of liquid water from the anode exhaust line 21, a fourth actuator 31 for controlling the feeding of liquid water to the cathode exhaust line 5, and a fifth actuator 32 for controlling the feeding of liquid water to the cathode feed line 4 and to the dry feed line 9.

The humidifier 10 has a plurality of water vapor permeable membranes 11, fashioned as sheets. One side of the membranes 11 has the relatively dry cathode gas flowing across it and the other side has a flow of relatively humid cathode exhaust gas (exhaust gas). Driven by the higher partial pressure of the water vapor in the cathode exhaust gas, a transfer of water vapor occurs across the membrane 11 into the cathode operating gas, which is humidified in this way.

Finally, the dry feed line 9 is connected by a bypass line 34, having a bypass actuator, to the humidifier drain line 27.

Figure 2:
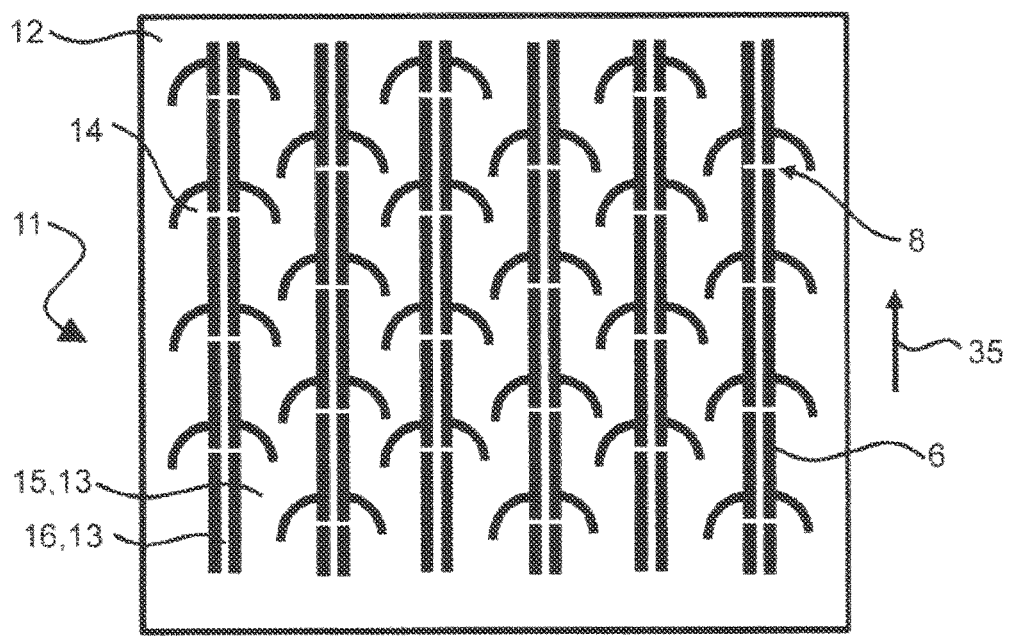
FIG. 2 shows a schematic representation of a first embodiment of a membrane of a humidifier.
Figure 3:
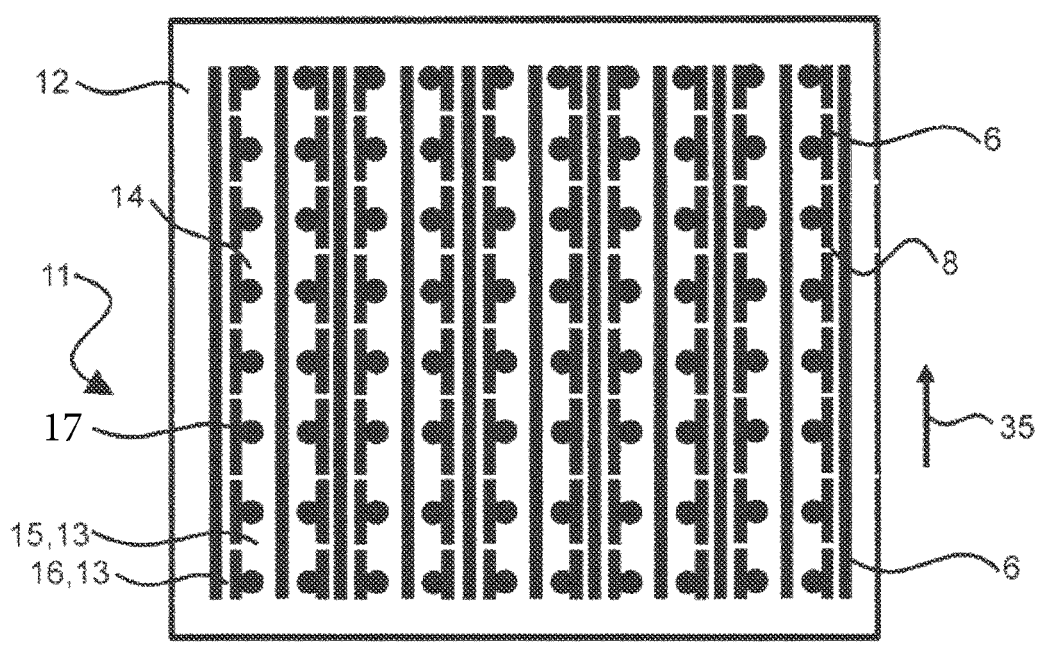
FIG. 3 shows a schematic representation of a second embodiment of a membrane of a humidifier.
Figure 4:
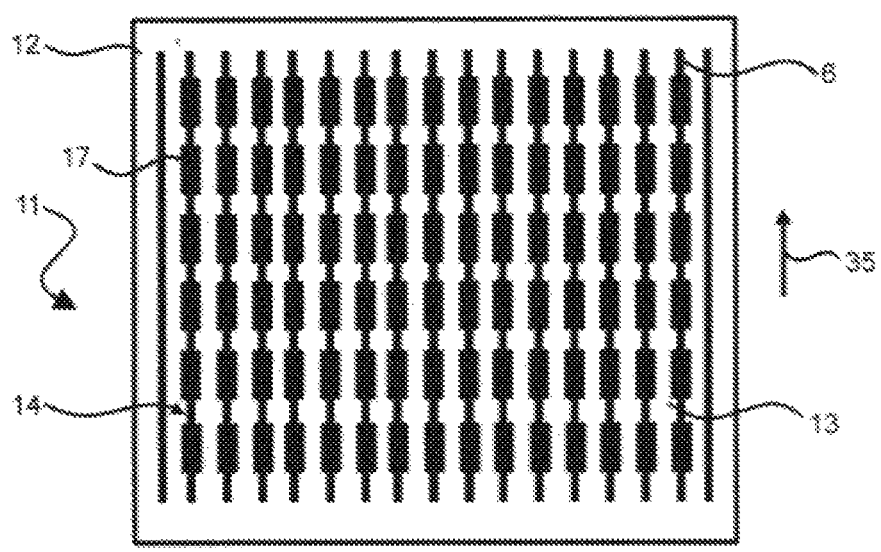
FIG. 4 shows a schematic representation of a third embodiment of a membrane of a humidifier.

FIGS. 2 to 4 show a highly simplified representation of different configurations of a surface 12 of the membrane 11 of the humidifier 10. A plurality of channels 13 are thereby formed on the surface 12 for the flow of a gas stream containing liquid water along a flow direction 35. The channels 13 are formed by flow webs 6 arranged on the surface 12 and they are associated with a plurality of storage elements 14 for the temporary storing of liquid water.

In the embodiment of the membrane 11 shown in FIG. 2, the flow webs 6 are arranged such that broad channels 15 having a first diameter and narrow channels 16 having a smaller diameter with respect to the first diameter are formed. The storage elements 14 formed as pockets are arranged on the flow webs 6 in the broad channels 15. These may be formed open against the flow direction 35. The gas flow moves in the broad channels 15 with a slower velocity than in the narrow channels 16, so that a lower static pressure prevails in the narrow channels 16 than in the broad channels 15. Each broad channel 15 is situated adjacent to a narrow channel 16 and every two flow webs 6 forming a first narrow channel 16 are alternately staggered. This, in turn, allows the storage elements 14 to be staggered with respect to one another and, accordingly, they can be designed larger. This results in that the flow field formed by the storage elements 14 having a larger storage capacity for liquid water. This, in turn, can reduce the size of the humidifier 10. The flow webs 6 have a plurality of connection channels 8 running perpendicular to a longitudinal direction of the flow webs 6 for pressure equalization between the narrow and the broad channels 15,16. This results in the liquid water being drawn into the storage elements 14. Furthermore, the diameters of the connection channels 8 are chosen such that the surface tension of the liquid water in the storage elements 14 prevents the liquid water from passing through the connection channel 8.

A second membrane 11 of the humidifier 10 shown in FIG. 3 likewise has broad and narrow channels 15, 16 on the surface 12. However, each narrow channel 16 is situated adjacent to another narrow channel 16 and to a broad channel 15. Only every other flow web 6 has a plurality of connection channels 8 formed perpendicular to the longitudinal extension of the flow webs 6. Furthermore, a plurality of elevations 17 are formed next to one of the flow webs 6 in the broad channels 15, there being formed a connection channel 8 each time between the elevations 17 on the flow web 6. In this way, the storage elements 14 are formed as pockets between the elevations 17. Furthermore, liquid water is drawn into the storage elements 14 by means of the connection channels 8 and held there.

FIG. 4 shows an especially easily manufactured third configuration of the membrane 11 of the humidifier 10. This is distinguished in that the flow webs 6 are arranged relative to each other such that the channels 13 have approximately the same diameter. Furthermore, elevations 17 are formed on the flow webs 6, such that the storage elements 14 are formed between the elevations 17.

The method for humidifying the reactant in the fuel cell system 1 thereby comprises the following steps:

At first, liquid water is extracted from the fuel cell stack 2. This occurs both on the anode side, where the liquid water from the anode spaces 19 is guided by means of the liquid water feed line 7 to the cathode exhaust line 5 or to the cathode feed line 4 and thus to the humidifier 10, and on the cathode side, where liquid water from the cathode spaces 18 is guided by means of the cathode exhaust line 5 to the humidifier 10. The liquid water so guided by means of the gas flow to the membrane 11 flows through the channels 13 formed on the surface 12 and is received at least partially in the storage elements 14 or also in a part of the storage elements 14 and stored temporarily. Finally, the storage elements 14 are at least partially emptied by evaporation of the liquid water contained therein, and the cathode gas to be fed to the fuel cell stack 2 is humidified by means of the evaporated liquid water. The emptying occurs in particular when the fuel cell system 1 is operating in an operating mode when more water is required, or when the membrane 11 drops below a predetermined or predeterminable humidity threshold value.

Because of the temporary storing and subsequent extracting of the liquid water in the flow field of the membrane 11 of the humidifier 10 formed by the storage elements, less transfer of liquid water through the membrane 11 is required, so that the membrane surface and thus the size of the humidifier 10 can be reduced.

Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for humidifying a reactant in a fuel cell system having a fuel cell stack fluidically connected to a humidifier, wherein the humidifier comprises a membrane, on whose surface channels are formed, wherein at least one of the channels is associated with a storage element for temporary storing of liquid water, wherein the channels are formed by a plurality of flow webs arranged on the surface, and wherein at least one of the flow webs has a connection channel running perpendicular to a longitudinal extension of the flow webs for pressure equalization between the channels, the method comprising:
   extracting the liquid water from the fuel cell stack and feeding the liquid water to the humidifier;
   admitting at least part of the liquid water into the storage element and temporarily storing the part of the liquid water in the storage element; and
   at least partially emptying the storage element by evaporating the liquid water and humidifying the reactant with the evaporated liquid water;
   wherein the liquid water is extracted from the fuel cell stack both at an anode and at a cathode.

2. The method according to claim 1, wherein the emptying of the liquid water from the storage element occurs when a humidity of the membrane drops below a predetermined or predeterminable threshold value.

3. A fuel cell system, comprising:
   a fuel cell stack connected to an anode feed line for feeding an anode gas on an anode side and an anode exhaust line for discharging the anode gas, and connected to a cathode feed line for feeding a cathode gas on a cathode side and to a cathode exhaust line;
   wherein the cathode exhaust line is fluidically connected to a humidifier and the humidifier has a water vapor permeable membrane, on whose surface channels are formed, wherein at least one of the channels is associated with a storage element for the temporary storage of liquid water;
   wherein the channels are formed by a plurality of flow webs arranged on the surface, and wherein at least one of the flow webs has a connection channel running perpendicular to a longitudinal extension of the flow webs for pressure equalization between the channels;

wherein a liquid water feed line is provided, connected to the anode exhaust line, being connected directly or indirectly to the humidifier for feeding liquid water to the humidifier from the anode side;

wherein the fuel cell system is configured to perform a method for humidifying a reactant in the fuel cell system, the method comprising:

extracting the liquid water from both the anode side and the cathode side of the fuel cell stack and feeding the liquid water to the humidifier;

admitting at least part of the liquid water into the storage element and temporarily storing the part of the liquid water in the storage element; and at least partially emptying the storage element by evaporating the liquid water and humidifying the reactant with the evaporated liquid water.

4. The fuel cell system according to claim 3, wherein the liquid water feed line is connected to the cathode exhaust line and/or to the cathode feed line.

5. The fuel cell system according to claim 3, wherein the diameter of the connection channel is chosen such that surface tension of the liquid water in the storage element prevents the liquid water from passing through the connection channel.

6. The fuel cell system according to claim 3, wherein the flow webs are arranged relative to each other such that broad channels are formed with a first diameter, and narrow channels with a smaller diameter than the first diameter, and wherein at least one of the narrow channels is situated adjacent to one of the broad channels.

7. The fuel cell system according to claim 3, wherein the storage element is formed as a pocket formed or arranged on the at least one of the flow webs.

8. The fuel cell system according to claim 6, wherein at least two elevations are formed in one of the channels, such that the storage element is formed as a pocket formed between the two elevations.

9. The fuel cell system according to claim 6, wherein at least two elevations are formed in one of the broad channels, such that the storage element is formed as a pocket formed between the two elevations.

* * * * *